US011748636B2

(12) United States Patent
Zhu et al.

(10) Patent No.: US 11,748,636 B2
(45) Date of Patent: Sep. 5, 2023

(54) PARKING SPOT LOCATOR BASED ON PERSONALIZED PREDICTIVE ANALYTICS

(71) Applicant: International Business Machines Corporation, Armonk, NY (US)

(72) Inventors: Jun Zhu, Cary, NC (US); Saurabh Sanjay Nachane, Cary, NC (US); Shikhar Kwatra, Durham, NC (US); Shilpi Bhattacharyya, Stony Brook, NY (US)

(73) Assignee: International Business Machines Corporation, Armonk, NY (US)

( * ) Notice: Subject to any disclaimer, the term of this patent is extended or adjusted under 35 U.S.C. 154(b) by 631 days.

(21) Appl. No.: 16/672,560

(22) Filed: Nov. 4, 2019

(65) Prior Publication Data

US 2021/0133603 A1    May 6, 2021

(51) Int. Cl.
| | |
|---|---|
| *G06N 5/04* | (2023.01) |
| *G06Q 10/04* | (2023.01) |
| *G06N 20/00* | (2019.01) |
| *G08G 1/14* | (2006.01) |
| *G06T 11/60* | (2006.01) |
| *G06Q 10/047* | (2023.01) |

(52) U.S. Cl.
CPC ............... *G06N 5/04* (2013.01); *G06N 20/00* (2019.01); *G06Q 10/047* (2013.01); *G06T 11/60* (2013.01); *G08G 1/144* (2013.01); *G08G 1/145* (2013.01); *G06T 2215/16* (2013.01)

(58) Field of Classification Search
CPC .......... G06N 5/04; G06N 20/00; G06N 3/006; G06Q 10/047; G06T 11/60; G06T 2215/16; G08G 1/144; G08G 1/145; G08G 1/148
See application file for complete search history.

(56) References Cited

U.S. PATENT DOCUMENTS

| | | |
|---|---|---|
| 5,910,782 A | 6/1999 | Schmitt et al. |
| 7,116,246 B2 | 10/2006 | Winter et al. |
| 9,076,336 B2 * | 7/2015 | Tippelhofer ........... G08G 1/143 |
| 9,123,058 B2 | 9/2015 | Ricci |

(Continued)

FOREIGN PATENT DOCUMENTS

KR    1641326 B1 *   7/2016   ............. G01S 19/01

OTHER PUBLICATIONS

KR101641326B1 (Machine Translation on May 29, 2022) (Year: 2016).*

(Continued)

*Primary Examiner* — Michael Le
(74) *Attorney, Agent, or Firm* — Michael O'Keefe (57) ABSTRACT

In an approach to creating and using a reinforcement learning model for personalizing a recommendation of a parking spot, one or more computer processors receive a first destination associated with the vehicle. One or more computer processors determine a parking spot availability in proximity to the destination. One or more computer processors determine a recommended parking spot location. One or more computer processors display the recommended parking spot location to the user. One or more computer processors determine a first parking spot selection. One or more computer processors receive a first satisfaction rating associated with the recommended parking spot location.

17 Claims, 4 Drawing Sheets

(56) References Cited

U.S. PATENT DOCUMENTS

| | | | |
|---|---|---|---|
| 9,576,250 B2 | 2/2017 | de Souza et al. | |
| 9,761,139 B2* | 9/2017 | Acker, Jr. | B62D 15/028 |
| 10,066,954 B1 | 9/2018 | Swanson et al. | |
| 2012/0056758 A1 | 3/2012 | Kuhlman et al. | |
| 2012/0299749 A1* | 11/2012 | Xiao | G08G 1/148 |
| | | | 340/932.2 |
| 2013/0120160 A1* | 5/2013 | Ren | G08G 1/144 |
| | | | 340/932.2 |
| 2013/0268187 A1* | 10/2013 | Scofield | G01C 21/3685 |
| | | | 701/400 |
| 2015/0066545 A1* | 3/2015 | Kotecha | G06Q 10/02 |
| | | | 705/5 |
| 2016/0300489 A1 | 10/2016 | Shafran | |
| 2017/0098376 A1* | 4/2017 | Wang | G08G 1/0129 |
| 2017/0191848 A1 | 7/2017 | Jones | |
| 2018/0276700 A1* | 9/2018 | Wang | G06Q 30/0217 |
| 2018/0308359 A1* | 10/2018 | Hayakawa | B62D 15/0285 |
| 2019/0063947 A1* | 2/2019 | Beaurepaire | G01C 21/3423 |
| 2019/0088127 A1 | 3/2019 | Bostick et al. | |
| 2019/0130243 A1* | 5/2019 | Penubothula | G01C 21/3484 |

OTHER PUBLICATIONS

L Lambrinos, A Dosis; DisAssist: An Internet of Things and Mobile Communications platform for Disabled Parking Space Management; 2013 IEEE Global Communications . . . , 2013—ieeexplore.ieee.org (Year: 2013).*

Fu et al., "Research on intelligent terminal oriented optimal parking space recommendation model", 2014 IEEE 17th International Conference on Intelligent Transportation Systems (ITSC), Oct. 8-11, 2014, Qingdao, China, 6 pages. <http://dialog.proquest.com/professional/docview/1634747752?accountid=153917>.

* cited by examiner

PARKING SPOT LOCATOR BASED ON PERSONALIZED PREDICTIVE ANALYTICS

BACKGROUND OF THE INVENTION

The present invention relates generally to the field of machine learning, and more particularly to a reinforcement learning model for personalizing a recommendation of a parking spot.

Reinforcement learning is an area of machine learning in which a model or algorithm is trained to take a suitable action to maximize reward in a particular situation. Reinforcement learning is employed by various software and machines to find the best possible behavior or path to take in a specific situation. Reinforcement learning differs from supervised learning. In supervised learning, the training data includes the correct answers. In reinforcement learning, there is no answer, but the reinforcement agent decides what to do to perform the given task. In the absence of training dataset, the model is bound to learn from experience. Reinforcement learning involves making decisions sequentially. In other words, the output depends on the state of the current input and the next input depends on the output of the previous input.

The internet of things (IoT) is the internetworking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each thing is uniquely identifiable through its embedded computing system but is able to interoperate within the existing Internet infrastructure.

SUMMARY

Embodiments of the present invention disclose a method, a computer program product, and a system for creating and using a reinforcement learning model for personalizing a recommendation of a parking spot. The method may include one or more computer processors receiving a first destination associated with the vehicle. One or more computer processors determine a parking spot availability in proximity to the destination. One or more computer processors determine a recommended parking spot location. One or more computer processors display the recommended parking spot location to the user. One or more computer processors determine a first parking spot selection. One or more computer processors receive a first satisfaction rating associated with the recommended parking spot location.

DETAILED DESCRIPTION

When a user is traveling to a destination, the user may encounter difficulty in finding a suitable parking lot or spot that meets the user's preferences. For example, a user may prefer to find the most economical parking solution and is willing to walk a long distance between the parking spot and the destination. In another example, a user may have a physical disability or just prefer to get in and out of a destination as quickly as possible, and therefore prefers to find a parking spot as close to the destination as possible and is willing to pay more for that convenience. Embodiments of the present invention recognize that efficiency may be gained by providing a system trained by reinforcement learning that can guide the user to an optimal parking lot or spot based on personalized predictive analytics utilizing user preferences and learned satisfaction ratings. Implementation of embodiments of the invention may take a variety of forms, and exemplary implementation details are discussed subsequently with reference to the Figures.

Figure 1:
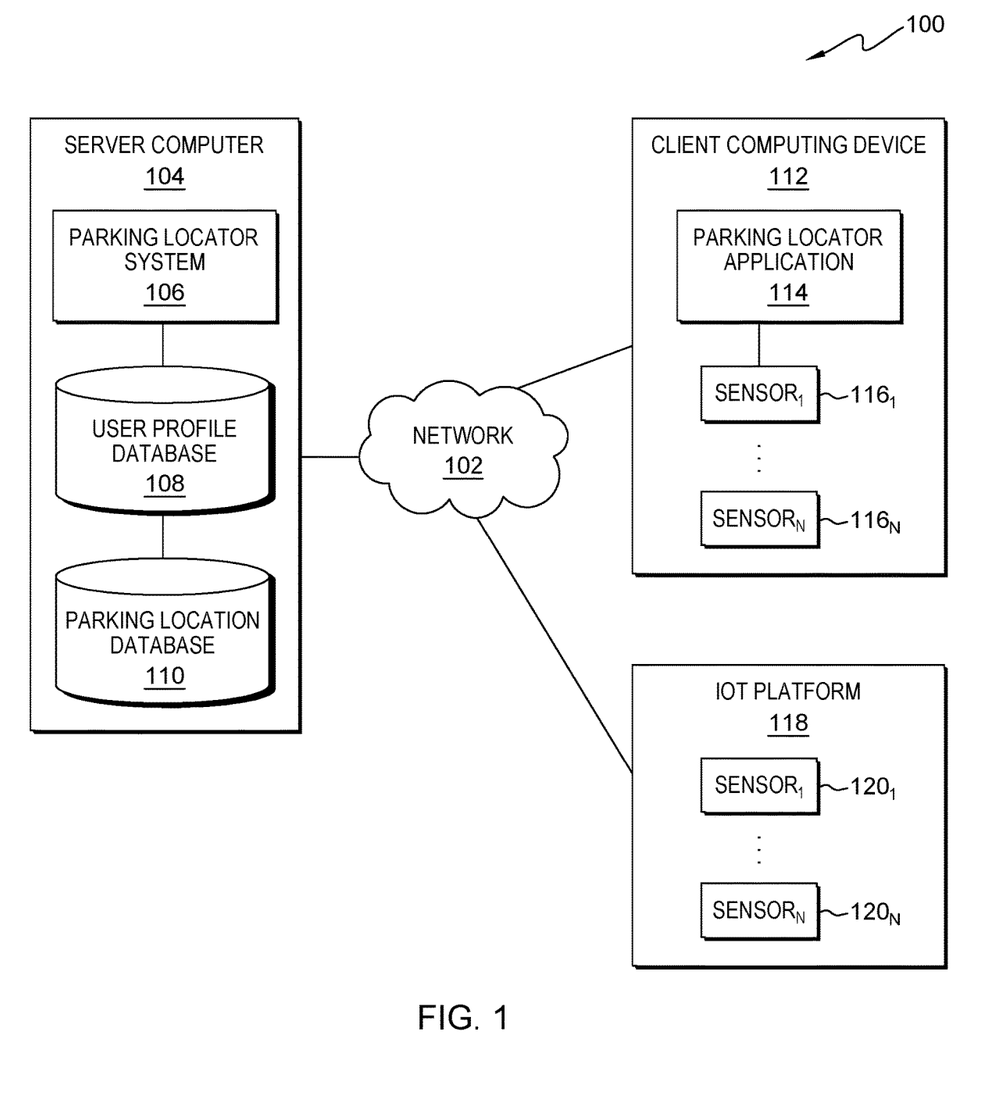
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, client computing device 112, and internet of things (IoT) platform 118, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks capable of receiving and transmitting data, voice, and/or video signals, including multimedia signals that include voice, data, and video information. In general, network 102 can be any combination of connections and protocols that will support communications between server computer 104, client computing device 112, IoT platform 118, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any programmable electronic device capable of communicating with client computing device 112, IoT platform 118, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes parking locator system 106, user profile database 108, and parking location database 110. Server computer 104 may include internal and external hardware components, as depicted and described in further detail with respect to FIG. 4.

Parking locator system 106 uses a reinforcement learning model (not shown) to guide a user to the most appropriate parking spot, considering user preferences and historical user patterns. During a training phase, parking locator system 106 receives user preferences. Responsive to receiving a desired destination from the user, parking locator system 106 determines the parking spot selected by the user. Parking locator system 106 retrieves data corresponding to the selected parking spot location. Parking locator system 106 receives user data corresponding to the selected parking spot location as well as a satisfaction rating. Parking locator system 106 correlates the satisfaction rating with the user preferences. Parking locator system 106 repeats this process until a threshold quantity of data is received, then parking locator system 106 determines a parking spot ranking prioritization mechanism based on the data. Once trained, parking locator system 106 receives the location of the user and the desired destination. Parking locator system 106 determines parking spot availability at or near the destination. Parking locator system 106 determines a recommended parking spot location and displays the recommendation to the user. Parking locator system 106 determines the selection of a parking spot by the user and receives a satisfaction rating of the selected parking spot. Parking locator system 106 stores the satisfaction rating with corresponding user data and feeds the stored data into the parking spot ranking prioritization mechanism. Parking locator system 106 is depicted and described in further detail with respect to FIG. 2 and FIG. 3.

User profile database 108 and parking location database 110 are each a repository for data used by parking locator system 106. User profile database 108 and parking location database 110 may each represent one or more databases. In the depicted embodiment, user profile database 108 and parking location database 110 reside on server computer 104. In another embodiment, user profile database 108 and parking location database 110 may each reside elsewhere within distributed data processing environment 100 provided parking locator system 106 has access to user profile database 108 and parking location database 110. A database is an organized collection of data. User profile database 108 and parking location database 110 can each be implemented with any type of storage device capable of storing data and configuration files that can be accessed and utilized by parking locator system 106, such as a database server, a hard disk drive, or a flash memory. User profile database 108 stores user-related data received, retrieved, and/or computed by parking locator system 106. User-related data includes, but is not limited to, user preferences for parking spots, user vehicle data such as make, model, dimensions, and available sensors, user calendar information, previous parking spot selections, and satisfaction ratings of recommended parking spots. Parking location database 110 stores data retrieved and/or computed by relating to a plurality of parking spots and/or lots. Parking location data includes, but is not limited to, location, latitude, longitude, global positioning system (GPS) coordinates, pricing, spot dimensions, total number of parking spots, availability of parking spots, physical characteristics of parking spots, such as whether or not the spots are under cover, and hours of operation of parking lots.

Client computing device 112 can be one or more of a laptop computer, a tablet computer, a smart phone, smart watch, a smart speaker, or any programmable electronic device capable of communicating with various components and devices within distributed data processing environment 100, via network 102. Client computing device 112 may be a wearable computer. Wearable computers are miniature electronic devices that may be worn by the bearer under, with, or on top of clothing, as well as in or connected to glasses, hats, or other accessories. Wearable computers are especially useful for applications that require more complex computational support than merely hardware coded logics. In one embodiment, the wearable computer may be in the form of a head mounted display. The head mounted display may take the form-factor of a pair of glasses. In an embodiment, the wearable computer may be in the form of a smart watch. In an embodiment, client computing device 112 may be integrated into a vehicle of the user. For example, client computing device 112 may include a heads up display in the windshield of the vehicle. In general, client computing device 112 represents one or more programmable electronic devices or combination of programmable electronic devices capable of executing machine readable program instructions and communicating with other computing devices (not shown) within distributed data processing environment 100 via a network, such as network 102. Client computing device 112 includes an instance of parking locator application 114 and sensor $116_{1-N}$.

Parking locator application 114 provides an interface between parking locator system 106 on server computer 104 and a user of client computing device 112. In one embodiment, parking locator application 114 is mobile application software. Mobile application software, or an "app," is a computer program designed to run on smart phones, tablet computers and other mobile devices. In one embodiment, parking locator application 114 may be a graphical user interface (GUI) or a web user interface (WUI) and can display text, documents, web browser windows, user options, application interfaces, and instructions for operation, and include the information (such as graphic, text, and sound) that a program presents to a user and the control sequences the user employs to control the program. Parking locator application 114 enables a user of client computing device 112 to provide preferences and satisfaction ratings to parking locator system 106 to continually train parking locator system 106 to recommend optimal parking spots. Parking locator application 114 also enables the user of client computing device 112 to receive parking spot recommendations.

Internet of things (IoT) platform 118 is a suite of components that enable a) deployment of applications that monitor, manage, and control connected devices and sensors; b) remote data collection from connected devices; and c) independent and secure connectivity between devices. The components may include, but are not limited to, a hardware architecture, an operating system, or a runtime library (not shown). In the depicted embodiment, IoT platform 118 includes sensor 120$_{1-N}$. In another embodiment, IoT platform 118 may include a plurality of other connected computing devices. For example, IoT platform 118 may include home security devices, such as alarms or smoke detectors. In another example, IoT platform 118 may include a home climate control system or various kitchen appliances. In a further example, IoT platform 118 may be a parking lot or destination security system.

A sensor is a device that detects or measures a physical property and then records or otherwise responds to that property, such as vibration, chemicals, radio frequencies, environment, weather, humidity, light, etc. Sensor 116$_{1-N}$ and sensor 120$_{1-N}$, herein sensor(s) 116 and sensor(s) 120, detect a plurality of attributes of a user of parking locator application 114 and parking lots and spots in a plurality of locations. As used herein, N represents a positive integer, and accordingly the number of scenarios implemented in a given embodiment of the present invention is not limited to those depicted in FIG. 1. Sensor(s) 116 and sensor(s) 120 may be one or more of a plurality of types of camera, including, but not limited to, pin-hole, stereo, omni-directional, non-central, infrared, video, digital, three dimensional, panoramic, filter-based, wide-field, narrow-field, telescopic, microscopic, etc. In some embodiments, sensor(s) 116 and sensor(s) 120 include any device capable of imaging a portion of the electromagnetic spectrum. If client computing device 112 is a wearable device, then sensor(s) 116 may include biometric sensors for detecting the physical condition of the user, such as blood pressure, heart rate, respiratory rate, calories burned, calories consumed, pulse, oxygen levels, blood oxygen level, glucose level, blood pH level, salinity of user perspiration, skin temperature, galvanic skin response, electrocardiography (ECG or EKG) data, body temperature, eye tracking data, etc. Sensor(s) 116 and sensor(s) 120 may be one or more of a plurality of types of microphone for detecting speech and other audible sounds, such as a car horn honking. Sensor(s) 116 and sensor(s) 120 may be able to detect weather conditions, such as air temperature, relative humidity, presence and type of precipitation, wind speed, etc., as user preferences may depend on the weather conditions. Sensor(s) 116 and sensor(s) 120 may be global positioning system (GPS) sensors. Sensor(s) 116 may be integrated into the vehicle of the user. Sensor(s) 120 may be integrated into a parking meter that records data corresponding to the user and the parking spot, which may include, but is not limited to, the name of the user, the vehicle's license plate number, the amount of time the user purchases for the parking spot, whether the user pays with cash or a credit card, and the amount of money the user pays for the parking spot.

The present invention may contain various accessible data sources, such as user profile database 108, that may include personal data, content, or information the user wishes not to be processed. Personal data includes personally identifying information or sensitive personal information as well as user information, such as tracking or geolocation information. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Parking locator system 106 and parking locator application 114 enable the authorized and secure processing of personal data. Parking locator system 106 and parking locator application 114 provide informed consent, with notice of the collection of personal data, allowing the user to opt in or opt out of processing personal data. Consent can take several forms. Opt-in consent can impose on the user to take an affirmative action before personal data is processed. Alternatively, opt-out consent can impose on the user to take an affirmative action to prevent the processing of personal data before personal data is processed. Parking locator system 106 and parking locator application 114 provide information regarding personal data and the nature (e.g., type, scope, purpose, duration, etc.) of the processing. Parking locator system 106 and parking locator application 114 provide the user with copies of stored personal data. Parking locator system 106 and parking locator application 114 allow the correction or completion of incorrect or incomplete personal data. Parking locator system 106 and parking locator application 114 allow the immediate deletion of personal data.

Figure 2:
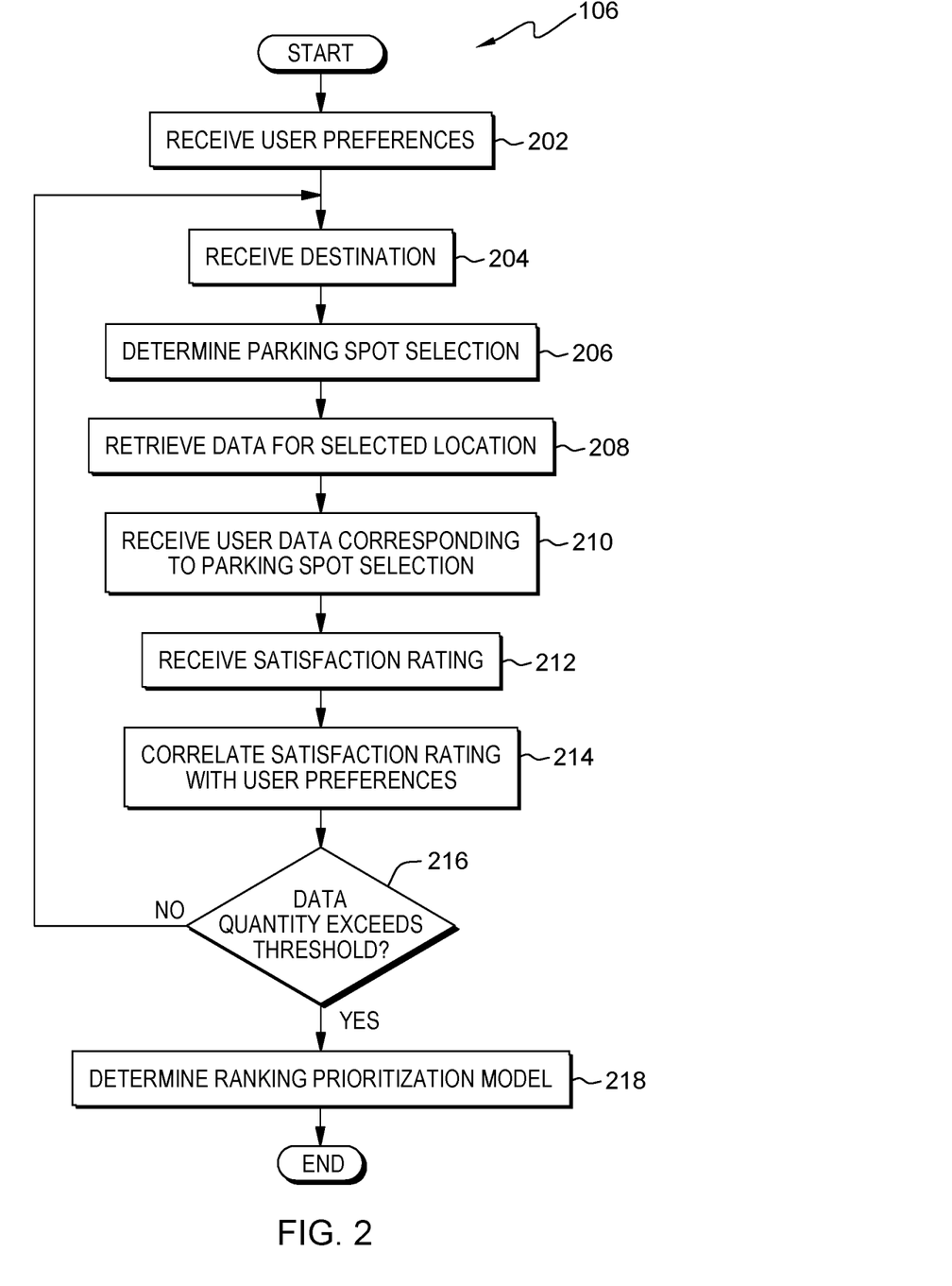
FIG. 2 is a flowchart depicting operational steps of a parking locator system, on a server computer within the distributed data processing environment of FIG. 1, for training a parking spot ranking prioritization model, in accordance with an embodiment of the present invention.

FIG. 2 is a flowchart depicting operational steps of parking locator system 106, on server computer 104 within distributed data processing environment 100 of FIG. 1, for training a parking spot ranking prioritization model, in accordance with an embodiment of the present invention.

Parking locator system 106 receives user preferences (step 202). Parking locator system 106 receives preferences, metadata, and attributes from the user, herein collectively referred to as user preferences, via parking locator application 114. User preferences include, but are not limited to, distance parameters, i.e., the desired parking proximity to a destination, pricing preferences, i.e., how much the user is willing to pay for a desired parking spot, parking spot preferences, i.e., spot dimensions, covered/uncovered, etc., destination type, e.g., office, home, shopping mall, grocery store, etc., as well as information associated with the vehicle, i.e., vehicle make, vehicle model and year, vehicle size, vehicle dimensions (x, y, and z), vehicle equipment and sensor capabilities, etc. In one embodiment, once the user provides the vehicle make and model, parking locator system 106 retrieves the additional information about the vehicle from the vehicle manufacturer's database (not shown). In another embodiment, parking locator system 106 may receive data via crowdsourcing. For example, if a first user does not know the attributes of the vehicle, then parking locator system 106 can find a second user with a similar vehicle and use the vehicle attributes from the preferences of the second user for the vehicle of the first user. In an embodiment, parking locator system 106 pre-processes any received categorical features that are not binary to convert the feature to a numerical feature. In one embodiment, the parking locator system 106 may pre-process the features using one hot encoder. Parking locator system 106 stores the received data in user profile database 108.

Parking locator system 106 receives a destination (step 204). In one embodiment, parking locator system 106 receives a destination from the user when the user enters the destination in parking locator application 114. In another embodiment, parking locator system 106 may determine the destination once the user has arrived at the destination by receiving one or more images of the destination from sensor(s) 116 and/or sensor(s) 120 in proximity to the destination. In a further embodiment, parking locator system 106 may receive the destination by receiving GPS coordinates from sensor(s) 116 and/or sensor(s) 120.

Parking locator system 106 determines a parking spot selection (step 206). Parking locator system 106 may determine the parking spot selected by the user in a plurality of methods. In one embodiment, parking locator system 106 determines the parking spot selection by receiving a notification from the user, via parking locator application 114. In another embodiment, parking locator system 106 determines the parking spot selection by monitoring sensor(s) 120 for images of the vehicle in a parking lot or other location. In a further embodiment, parking locator system 106 determines the parking spot selection by receiving GPS coordinates from sensor(s) 116 after the vehicle is stopped for a threshold duration of time.

Parking locator system 106 retrieves data for selected location (step 208). In an embodiment, parking locator system 106 retrieves previously stored data corresponding to the selected parking spot from parking location database 110. In an embodiment, parking locator system 106 receives one or more images of the selected parking spot from sensor(s) 120, and determines, from the images and metadata associated with the images, attributes of the parking spot, such as the location and dimensions of the parking spot and/or the parking lot, the price of the parking spot, whether the spot is covered or open, and the distance of the parking spot from the received destination. In an embodiment, sensor(s) 120 transmit the data associated with the parking spot directly to parking location database 110, and parking locator system 106 retrieves the data from parking location database 110. In an embodiment, if sensor(s) 116 have detected any parking location data, then parking locator system 106 may retrieve data from storage on client computing device 112 (not shown), or sensor(s) 116 may transmit the data associated with the parking spot directly to parking location database 110, and parking locator system 106 retrieves the data from parking location database 110.

Parking locator system 106 receives user data corresponding to the parking spot selection (step 210). In an embodiment where sensor(s) 116 include one or more biometric sensors, parking locator system 106 receives additional data to give more context to the parking spot selection, for example, the number of steps the user takes between the parking spot and the destination. Parking locator system 106 may also receive data, via parking locator application 114, that indicates the parking lot selection, for example, as a favorite. Parking locator system 106 may also receive user data from sensor(s) 116 from which parking locator system 106 can determine a sentiment of the user. For example, parking locator system 106 may use a visual recognition application to receive an image of the user's facial expression to determine whether the user is pleased with the parking spot selection. In another example, parking locator system 106 may receive an audio clip of any remarks the user made when selecting the parking spot. Parking locator system 106 may also receive user data from sensor(s) 116 that indicate the distance between the vehicle and surrounding vehicles, for example if sensor(s) 116 include cameras that capture an outside view of the vehicle.

Parking locator system 106 receives a satisfaction rating (step 212). In an embodiment, parking locator system 106 receives a satisfaction rating of the selected parking spot from the user via input by the user into parking locator application 114. For example, the user may choose a rating from list of ratings. In another example, the user may enter, via text or speech, a description of the satisfaction rating. In an embodiment, the satisfaction rating may be a numeric scale, for example, one to five. In another embodiment, the satisfaction rating may be a selection of textual terms, for example, very satisfied, satisfied, neutral, dissatisfied, very dissatisfied. In an embodiment, parking locator application 114 may ask the user to include a reason for the rating. In another embodiment, parking locator system 106 may receive a satisfaction rating by observing the sentiment of the user via sensor(s) 116 and/or sensor(s) 120. For example, parking locator system 106 may receive an image or video of the face of the user displaying a smile or a frown. In a further embodiment, parking locator system 106 may receive a satisfaction rating via speech or other audible sounds detected by sensor(s) 116. For example, the user may say "this spot is so far away from the store." In one embodiment, parking locator system 106 receives the satisfaction rating as soon as the user parks the vehicle. In other embodiments, parking locator system 106 receives the satisfaction rating after the user returns to the vehicle or after the user drives away from the parking spot.

Parking locator system 106 correlates the satisfaction rating with user preferences (step 214). Parking locator system 106 creates a matrix of user preferences versus parking spot locations and determines a direct correlation in the dataset between known preferences and the received satisfaction rating. For example, if the parking spot was in close proximity to the destination, and cost $15 per hour, and the satisfaction rating was high, then parking locator system 106 can correlate close proximity to the user being highly satisfied, even if the price is high.

Parking locator system 106 determines if the data quantity exceeds a threshold (decision block 216). Parking locator system 106 requires a threshold quantity of parking spot data per user in order to determine a pattern history for use in creating a ranking prioritization model. In one embodiment, the threshold is a numerical quantity of data points. For example, the threshold may be 5000 data points. In another embodiment, the threshold may be data collection spanning a specified time period. For example, the threshold may be data collection over a total of ten days.

If parking locator system 106 determines the data quantity does not exceed the threshold ("no" branch, decision block 216), then parking locator system 106 returns to step 204 to receive a new destination. If parking locator system 106 determines more data is needed to establish a parking pattern history for the user, then parking locator system 106 iterates through the described steps until the threshold is exceeded.

If parking locator system 106 determines the data quantity exceeds the threshold ("yes" branch, decision block 216), then parking locator system 106 determines a ranking prioritization model (step 218). If parking locator system 106 determines sufficient data exists, then parking locator system 106 proceeds to determine a parking spot ranking prioritization model for the user. The ranking prioritization model is a reinforcement learning model, also known as a feedback model, which uses a reward predictor. During the training phase, parking locator system 106 determines an initial ranking prioritization model based on user preferences, the parking spot location, and the satisfaction rating. As time passes, and parking locator system 106 continuously gets more feedback from the user, parking locator system 106 refines the ranking prioritization model with additional data. In one embodiment, parking locator system 106 uses a structured data format to determine the ranking prioritization model. In one embodiment, parking locator system 106 uses a weighted matrix model to determine the ranking prioritization model. In the embodiment, the weighted version of the algorithm introduces different weights for the zero, or unobserved, entries and the non-zero entries in the matrix for different parking locations based on availability and the user's selection. An example of the weighted algorithm is:

$$L^w = w \times \sum_i (r_i - x^T \times y_i)^2$$

where L is a loss function, w is a weight for a specific user, x takes into account the user's preferences, y is the parking spot location, r refers to the rating/ranking of the parking spot based on learned preferences, T refers to a transpose of the x matrix, and i refers to the number of iterations. The algorithm predicts how the model is deviating from the training set by computing the variation. The goal is to minimize the loss function. The weight is scaled by the sum of the non-zero entries in a row to normalize the weight for users who have parked or rated a different number of locations based on the users' preferences. Via machine learning, the model learns to weight the preferences of the user in relation to the importance of a preference to a user. For example, if a user has an expensive car, and the user prefers to park in a large spot, to minimize potential damage to the car, then parking locator system 106 weights the preference for a large spot higher than, for example, a preference for a low price.

As training progresses, i.e., iterates through the steps, parking locator system 106 updates the reward function based on user actions and corresponding states. The following is an example of the reinforcement learning code:

```
public class EmotionalMotivationManager : ArrayParamMotivationManager
{
  public override DenseVector GetRewardFeatures(uint prevState, uint action, uint nextState)
  {
    return new DenseVector(new[ ]
      {
        this.GetFeature1(prevState, action),
        this.GetFeature2(prevState, action),
        ...
        this.GetExtrinsicReward(prevState, action)
      });
  }
}
this.ParamIDNames = new[ ] {"Feature1", "Feature2", "Feature3", ..., "Fit. Param"};this.ParamIDLetters = new[ ] {'a', 'b', 'c', ..., 'z'};this.ParamsStepIntervals= StepInterval<double>.CreateArray(stepInterval, NUM_FEATURES);
```

Figure 3:
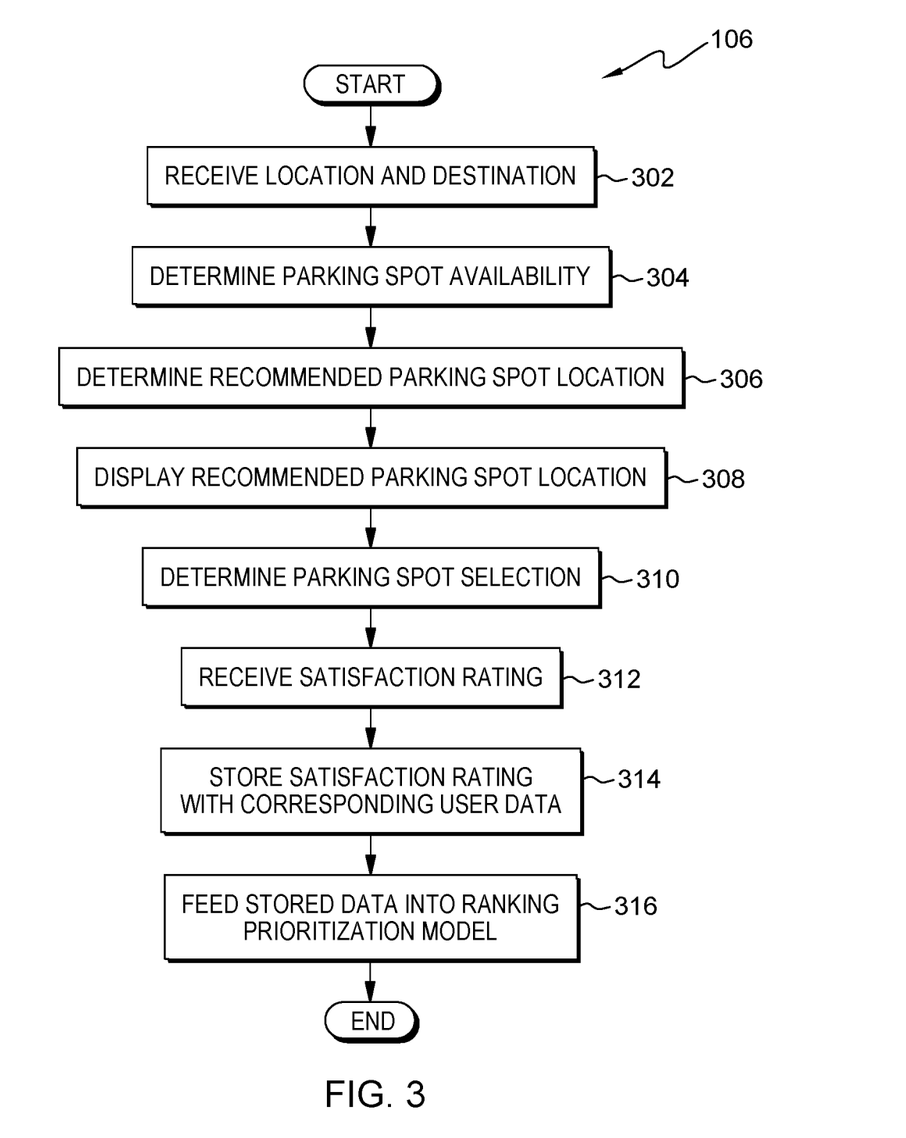
FIG. 3 is a flowchart depicting operational steps of the parking locator system, on the server computer within the distributed data processing environment of FIG. 1, for recommending a parking spot, in accordance with an embodiment of the present invention.

FIG. 3 is a flowchart depicting operational steps of parking locator system 106, on server computer 104 within distributed data processing environment 100 of FIG. 1, for recommending a parking spot, in accordance with an embodiment of the present invention.

Parking locator system 106 receives a location and a destination (step 302). In one embodiment, parking locator system 106 receives the location of the user and the desired destination via parking locator application 114 when the user inputs that data. In one embodiment, the user chooses the current location and destination from a map provided by parking locator application 114. In an embodiment where sensor(s) 116 include a microphone, parking locator system 106 may receive the location and destination via a speech to text transcription service as the user speaks to client computing device 112. In one embodiment, parking locator system 106 receives only the destination via parking locator application 114. In an embodiment, parking locator system 106 receives the location of the user via GPS coordinates provided by sensor(s) 116. In one embodiment, parking locator system 106 determines the destination based on a calendar associated with the user. For example, parking locator system 106 may determine the user is traveling to a dentist appointment based on an entry in a calendar associated with the user. In one embodiment, parking locator system 106 determines the destination based on learned patterns. For example, if the user historically goes to the grocery store after work on Fridays, then parking locator system 106 can determine that if the user enters the vehicle at 5:00 pm on a Friday, then the destination is likely to be the grocery store. In an embodiment, parking locator system 106 also determines an arrival time at the destination, or at a location in proximity to the destination, based on techniques that would be recognized by a person of skill in the art.

Parking locator system 106 determines parking spot availability (step 304). Parking locator system 106 retrieves parking spot data from parking location database 110 to determine one or more parking spots in proximity to the received destination. Parking locator system 106 determines proximity based on a threshold distance, where the threshold distance may be defined by the user and stored in user profile database 108, or the threshold distance may be determined by the ranking prioritization model based on previous satisfaction ratings. In one embodiment, parking locator system 106 determines availability of parking spots based on data received from sensor(s) 120. For example, if sensor(s) 120 are parking lot cameras, then parking locator system 106 may receive images that display available parking spots. In another example, if sensor(s) 120 detect and count the entrance and exit of vehicles from a parking lot, then parking locator system 106 receives numerical data from sensor(s) 120 regarding the quantity of parking spots available in the lot.

Parking locator system 106 determines a recommended parking spot location (step 306). Based on the weighted matrix and ranking prioritization model, which consider user preferences, historical patterns, and satisfaction ratings, as discussed with respect to FIG. 2, parking locator system 106 determines one or more parking spots to recommend to the user. In an embodiment, parking locator system 106 considers the estimated time of arrival of the user in proximity to the destination from the user's current location to determine a recommended parking spot location.

Parking locator system 106 displays the recommended parking spot location (step 308). In one embodiment, parking locator system 106 displays the one or more recommended parking spot locations to the user via parking locator application 114. For example, in an embodiment where client computing device 112 is a wearable device with augmented reality capability, parking locator system 106 displays the recommended location as an overlay in the field of view of the user. In another example, in an embodiment where client computing device 112 is integrated into the vehicle, parking locator system 106 displays the recommended location on a screen or heads up display associated with the vehicle. In a further example, in an embodiment where client computing device 112 is a smart phone or smart watch, parking locator system 106 displays the recommended location on a screen associated with the with the smart phone or smart watch. In one embodiment, instead of or in addition to displaying the recommended parking spot location, parking locator system 106 may provide an audible indication of the recommended location. In one embodiment, parking locator system 106 may link to a navigation application that resides on client computing device 112 (not shown) and instruct the navigation application to provide directions to the user for finding the recommended parking spot location. In an embodiment, if a recommended parking spot is taken by another vehicle before the user arrives, then parking locator system 106 can display a message for the user which indicates that the parking spot is no longer available and provides the next best recommendation.

Parking locator system 106 determines a parking spot selection (step 310). As discussed with respect to step 206 of FIG. 2, parking locator system 106 may determine the parking spot selected by the user via a plurality of methods. Parking locator system 106 determines whether the user selected the recommended parking spot or a different parking spot.

Parking locator system 106 receives a satisfaction level (step 312). As discussed with respect to step 212 of FIG. 2, parking locator system 106 may determine the satisfaction rating by the user via a plurality of methods. The choice of a parking spot that was not recommended may indicate to parking locator system 106 that the user was not satisfied with the recommended spot, or that the user was more satisfied with the selected spot.

Parking locator system 106 stores the satisfaction rating with corresponding user data (step 314). In an embodiment, parking locator system 106 stores the received satisfaction level in the weighted matrix with other data corresponding to the preferences of the user and historical parking spot selections in user profile database 108.

Parking locator system 106 feeds the stored data into the ranking prioritization model (step 318). Parking locator system 106 feeds the stored satisfaction rating with the corresponding user data into the ranking prioritization model in order to further train the model to predict optimal parking spots for the user. Continual reinforcement, or feedback, learning by the model optimizes the reward (for high satisfaction ratings) or penalty (for low satisfaction ratings), creating a dynamic scoring model. In an embodiment, feeding the stored data into the ranking prioritization model occurs at step 214 of FIG. 2, which increases the quantity of data which parking locator system 106 uses to determine the ranking prioritization model, and further trains and refines the model for each instance of data received from the user.

Figure 4:
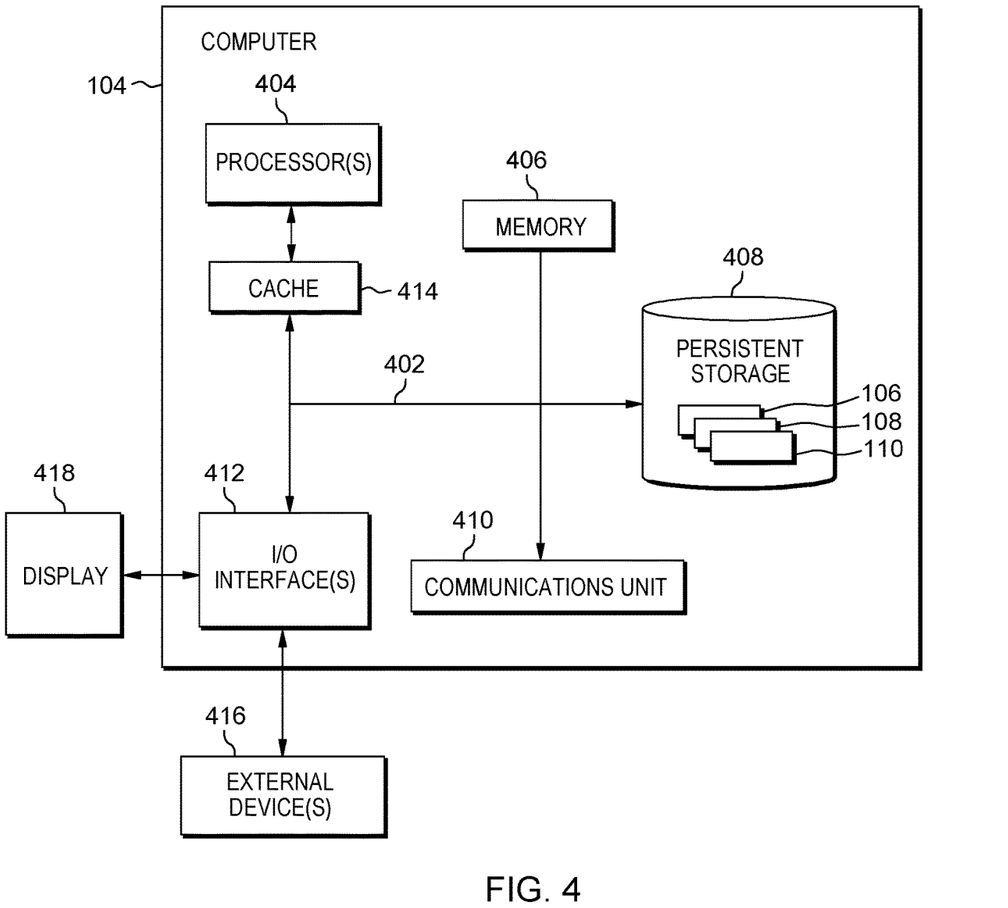
FIG. 4 depicts a block diagram of components of the server computer executing the parking locator system within the distributed data processing environment of FIG. 1, in accordance with an embodiment of the present invention.

FIG. 4 depicts a block diagram of components of server computer 104 within distributed data processing environment 100 of FIG. 1, in accordance with an embodiment of the present invention. It should be appreciated that FIG. 4 provides only an illustration of one implementation and does not imply any limitations with regard to the environments in which different embodiments can be implemented. Many modifications to the depicted environment can be made.

Server computer 104 can include processor(s) 404, cache 414, memory 406, persistent storage 408, communications unit 610, input/output (I/O) interface(s) 412 and communications fabric 402. Communications fabric 402 provides communications between cache 414, memory 406, persistent storage 408, communications unit 410, and input/output (I/O) interface(s) 412. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM). In general, memory 406 can include any suitable volatile or non-volatile computer readable storage media. Cache 414 is a fast memory that enhances the performance of processor(s) 404 by holding recently accessed data, and data near recently accessed data, from memory 406.

Program instructions and data used to practice embodiments of the present invention, e.g., parking locator system 106, user profile database 108, and parking location database 110, are stored in persistent storage 408 for execution and/or access by one or more of the respective processor(s) 404 of server computer 104 via cache 414. In this embodiment, persistent storage 408 includes a magnetic hard disk drive. Alternatively, or in addition to a magnetic hard disk drive, persistent storage 408 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 410, in these examples, provides for communications with other data processing systems or devices, including resources of client computing device 112 and IoT platform 118. In these examples, communications unit 410 includes one or more network interface cards. Communications unit 410 may provide communications through the use of either or both physical and wireless communications links. Parking locator system 106, user profile database 108, parking location database 110, and other programs and data used for implementation of the present invention, may be downloaded to persistent storage 408 of server computer 104 through communications unit 410.

I/O interface(s) 412 allows for input and output of data with other devices that may be connected to server computer 104. For example, I/O interface(s) 412 may provide a connection to external device(s) 416 such as a keyboard, a keypad, a touch screen, a microphone, a digital camera, and/or some other suitable input device. External device(s) 416 can also include portable computer readable storage media such as, for example, thumb drives, portable optical or magnetic disks, and memory cards. Software and data used to practice embodiments of the present invention, e.g., parking locator system 106, user profile database 108, and parking location database 110, can be stored on such portable computer readable storage media and can be loaded onto persistent storage 408 via I/O interface(s) 412. I/O interface(s) 412 also connect to a display 418.

Display 418 provides a mechanism to display data to a user and may be, for example, a computer monitor. Display 418 can also function as a touch screen, such as a display of a tablet computer.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    determining, by one or more computer processors, a first destination associated with a vehicle of a user based on one or more learned patterns of the user;
    determining, by one or more computer processors, a parking spot availability in proximity to the first destination;
    determining, by one or more computer processors, a recommended parking spot location, further comprising:
        receiving, by one or more computer processors, one or more user preferences associated with a parking spot recommendation;
        receiving, by one or more computer processors, a second destination associated with the vehicle;
        determining, by one or more computer processors, a first parking spot selection;
        retrieving, by one or more computer processors, data corresponding to the first parking spot;
        receiving, by one or more computer processors, a quantity of user data points corresponding to the first parking spot selection, wherein the user data points include at least a distance between the vehicle of the user and one or more surrounding vehicles;
        receiving, by one or more computer processors, a first satisfaction rating corresponding to the first parking spot selection;
        correlating, by one or more computer processors, the first satisfaction rating to the one or more user preferences;
        determining, by one or more computer processors, that the quantity of received user data points corresponding to the first parking spot selection was received over a time period that exceeds a specified time period threshold; and
        determining, by one or more computer processors, a ranking prioritization model for parking spot recommendations based on the correlation of the first satisfaction rating to the one or more user preferences and the user data points corresponding to the first parking spot selection;
    displaying, by one or more computer processors, the recommended parking spot location to the user;
    determining, by one or more computer processors, a second parking spot selection by the user; and
    responsive to determining the second parking spot selection by the user, receiving, by one or more computer processors, a second satisfaction rating associated with the recommended parking spot location from the user, wherein the second satisfaction rating is received by observing a sentiment of the user.

2. The method of claim 1, further comprising:
    storing, by one or more computer processors, the second satisfaction rating associated with the recommended parking spot location with the one or more user preferences associated with the parking spot recommendation; and
    feeding, by one or more computer processors, the stored second satisfaction rating associated with the recommended parking spot location with the one or more user preferences associated with the parking spot recommendation into the ranking prioritization model.

3. The method of claim 1, wherein retrieving data corresponding to the first parking spot comprises retrieving, by one or more computer processors, data detected by one or more sensors associated with an Internet of Things platform.

4. The method of claim 1, wherein the user data points corresponding to the first parking spot selection are selected from the group consisting of: biometric data, a number of steps from the first parking spot to the second destination, a sentiment of the user, an image of a facial expression of the user, and an audio clip of a remark made by the user.

5. The method of claim 1, wherein user preferences are selected from the group consisting of: a distance parameter, a desired parking proximity to a destination, a weather dependence, a parking spot pricing preference, a parking spot dimension, a parking spot cover, a destination type, a vehicle make, a vehicle model, a vehicle year, a vehicle dimension, a vehicle size, vehicle equipment, and a vehicle sensor capability.

6. The method of claim 1, wherein displaying the recommended parking spot location to the user comprises overlaying, by one or more computer processors, the recommended parking spot location in a field of view of a device with augmented reality capability worn by the user.

7. A computer program product comprising:
    one or more computer readable storage devices and program instructions stored on the one or more computer readable storage devices, the stored program instructions comprising:
    program instructions to determine a first destination associated with a vehicle of a user based on one or more learned patterns of the user;
    program instructions to determine a parking spot availability in proximity to the first destination;
    program instructions to determine a recommended parking spot location, the stored program instructions further comprising:
        program instructions to receive one or more user preferences associated with a parking spot recommendation;
        program instructions to receive a second destination associated with the vehicle;
        program instructions to determine a first parking spot selection;
        program instructions to retrieve data corresponding to the first parking spot;
        program instructions to receive a quantity of user data points corresponding to the first parking spot selection, wherein the user data points include at least a distance between the vehicle of the user and one or more surrounding vehicles;
        program instructions to receive a first satisfaction rating corresponding to the first parking spot selection;
        program instructions to correlate the first satisfaction rating to the one or more user preferences;

program instructions to determine that the quantity of received user data points corresponding to the first parking spot selection was received over a time period that exceeds a specified time period threshold; and program instructions to determine a ranking prioritization model for parking spot recommendations based on the correlation of the first satisfaction rating to the one or more user preferences and the user data points corresponding to the first parking spot selection;

program instructions to display the recommended parking spot location to the user;

program instructions to determine a second parking spot selection by the user; and responsive to determining the second parking spot selection by the user, program instructions to receive a second satisfaction rating associated with the recommended parking spot location from the user, wherein the second satisfaction rating is received by observing a sentiment of the user.

8. The computer program product of claim 7, the stored program instructions further comprising:

program instructions to store the second satisfaction rating associated with the recommended parking spot location with the one or more user preferences associated with the parking spot recommendation; and program instructions to feed the stored second satisfaction rating associated with the recommended parking spot location with the one or more user preferences associated with the parking spot recommendation into the ranking prioritization model.

9. The computer program product of claim 7, wherein the program instructions to retrieve data corresponding to the first parking spot comprise program instructions to retrieve data detected by one or more sensors associated with an Internet of Things platform.

10. The computer program product of claim 7, wherein the user data points corresponding to the first parking spot selection are selected from the group consisting of: biometric data, a number of steps from the first parking spot to the second destination, a sentiment of the user, an image of a facial expression of the user, and an audio clip of a remark made by the user.

11. The computer program product of claim 7, wherein user preferences are selected from the group consisting of: a distance parameter, a desired parking proximity to a destination, a weather dependence, a parking spot pricing preference, a parking spot dimension, a parking spot cover, a destination type, a vehicle make, a vehicle model, a vehicle year, a vehicle dimension, a vehicle size, vehicle equipment, and a vehicle sensor capability.

12. The computer program product of claim 7, wherein the program instructions to display the recommended parking spot location to the user comprise program instructions to overlay the recommended parking spot location in a field of view of a device with augmented reality capability worn by the user.

13. A computer system comprising:
one or more computer processors;
one or more computer readable storage devices;
program instructions stored on the one or more computer readable storage devices for execution by at least one of the one or more computer processors, the stored program instructions comprising:
program instructions to determine a first destination associated with a vehicle of a user based on one or more learned patterns of the user;

program instructions to determine a parking spot availability in proximity to the first destination;

program instructions to determine a recommended parking spot location, the stored program instructions further comprising:

program instructions to receive one or more user preferences associated with a parking spot recommendation;

program instructions to receive a second destination associated with the vehicle;

program instructions to determine a first parking spot selection;

program instructions to retrieve data corresponding to the first parking spot;

program instructions to receive a quantity of user data points corresponding to the first parking spot selection, wherein the user data points include at least a distance between the vehicle of the user and one or more surrounding vehicles;

program instructions to receive a first satisfaction rating corresponding to the first parking spot selection;

program instructions to correlate the first satisfaction rating to the one or more user preferences;

program instructions to determine that the quantity of received user data points corresponding to the first parking spot selection was received over a time period that exceeds a specified time period threshold; and program instructions to determine a ranking prioritization model for parking spot recommendations based on the correlation of the first satisfaction rating to the one or more user preferences and the user data points corresponding to the first parking spot selection;

program instructions to display the recommended parking spot location to the user;

program instructions to determine a second parking spot selection by the user; and responsive to determining the second parking spot selection by the user, program instructions to receive a second satisfaction rating associated with the recommended parking spot location from the user, wherein the second satisfaction rating is received by observing a sentiment of the user.

14. The computer system of claim 13, the stored program instructions further comprising:

program instructions to store the second satisfaction rating associated with the recommended parking spot location with the one or more user preferences associated with the parking spot recommendation; and program instructions to feed the stored second satisfaction rating associated with the recommended parking spot location with the one or more user preferences associated with the parking spot recommendation into the ranking prioritization model.

15. The computer system of claim 13, wherein the program instructions to retrieve data corresponding to the first parking spot comprise program instructions to retrieve data detected by one or more sensors associated with an Internet of Things platform.

16. The computer system of claim 13, wherein the user data points corresponding to the first parking spot selection are selected from the group consisting of: biometric data, a number of steps from the first parking spot to the second destination, a sentiment of the user, an image of a facial expression of the user, and an audio clip of a remark made by the user.

17. The computer system of claim 13, wherein user preferences are selected from the group consisting of: a distance parameter, a desired parking proximity to a destination, a weather dependence, a parking spot pricing preference, a parking spot dimension, a parking spot cover, a destination type, a vehicle make, a vehicle model, a vehicle year, a vehicle dimension, a vehicle size, vehicle equipment, and a vehicle sensor capability.

* * * * *